(12) United States Patent
Liao et al.

(10) Patent No.: US 10,992,644 B2
(45) Date of Patent: Apr. 27, 2021

(54) NETWORK SECURITY SYSTEM AND METHOD THEREOF

(71) Applicant: PEGATRON CORPORATION, Taipei (TW)

(72) Inventors: Chun-Min Liao, Taipei (TW); Yen-Ting Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 217 days.

(21) Appl. No.: 16/177,400

(22) Filed: Oct. 31, 2018

(65) Prior Publication Data
US 2019/0173843 A1    Jun. 6, 2019

(30) Foreign Application Priority Data

Dec. 4, 2017 (TW) ................................ 106142424

(51) Int. Cl.
*H04L 29/06* (2006.01)
*H04L 29/12* (2006.01)

(52) U.S. Cl.
CPC ........ *H04L 63/0263* (2013.01); *H04L 63/029* (2013.01); *H04L 63/0236* (2013.01); *H04L 63/20* (2013.01); *H04L 61/2503* (2013.01); *H04L 61/2514* (2013.01); *H04L 67/42* (2013.01)

(58) Field of Classification Search
CPC ............. H04L 63/0263; H04L 63/0236; H04L 63/029; H04L 63/20; H04L 61/2514; H04L 61/2503; H04L 67/42
USPC ........................................................ 726/13
See application file for complete search history.

(56) References Cited

U.S. PATENT DOCUMENTS

| 7,127,477 B2 * | 10/2006 | Duncombe | G06F 21/606 |
| | | | 709/238 |
| 7,320,140 B1 * | 1/2008 | Boyer | H04N 21/2541 |
| | | | 375/E7.009 |
| 7,559,082 B2 * | 7/2009 | Morgan | H04L 63/0227 |
| | | | 726/14 |

(Continued)

FOREIGN PATENT DOCUMENTS

WO    WO-2016155753 A1 *  10/2016 ......... H04L 41/0893

OTHER PUBLICATIONS

TR-181_Issue-2_Amendment-2 Feb. 2011.*

*Primary Examiner* — Badri Narayanan Champakesan
(74) *Attorney, Agent, or Firm* — McClure, Qualey & Rodack, LLP

(57) ABSTRACT

A network security system and method thereof are provided in this disclosure. The network security system includes a server and a client device. The client device is configured for running a firewall according to a first parameter corresponding to at least one setting category, and receiving a second parameters transmitted by the server within a periodic communication interval. The client device further includes a monitoring unit. The monitoring unit is configured for checking automatically whether a setting category of the second parameter matches the at least one setting category during a communication period between the server and the client device; if the setting category of the second parameter matches the at least one setting category, setting up the firewall according to the second parameter; and if the second parameter corresponding to setting category does not match the at least one setting category, omitting the second parameter.

6 Claims, 3 Drawing Sheets

(56) References Cited

U.S. PATENT DOCUMENTS

| | | | |
|---|---|---|---|
| 7,571,194 B2* | 8/2009 | Mettala | G06F 16/273 |
| 7,676,837 B2* | 3/2010 | Kilgore | H04W 12/0808 |
| | | | 726/13 |
| 8,056,124 B2* | 11/2011 | Bassett | H04L 63/0263 |
| | | | 726/11 |
| 8,103,763 B2* | 1/2012 | Slepov | H04L 41/0803 |
| | | | 709/224 |
| 8,869,132 B2* | 10/2014 | Srinivasa | H04L 41/084 |
| | | | 717/171 |
| 2003/0097590 A1* | 5/2003 | Syvanne | H04L 63/0227 |
| | | | 726/4 |
| 2005/0050078 A1* | 3/2005 | Vasey | G06F 40/174 |
| 2005/0201391 A1* | 9/2005 | Ma | H04L 61/2514 |
| | | | 370/401 |
| 2005/0220126 A1* | 10/2005 | Gervais | H04L 63/20 |
| | | | 370/401 |
| 2009/0300416 A1* | 12/2009 | Watanabe | G06F 11/1484 |
| | | | 714/19 |
| 2010/0070614 A1* | 3/2010 | Keum | G06F 15/163 |
| | | | 709/219 |
| 2011/0276683 A1* | 11/2011 | Goldschlag | H04W 12/0808 |
| | | | 709/224 |
| 2011/0302639 A1* | 12/2011 | Matsuda | H04L 63/101 |
| | | | 726/6 |
| 2016/0301566 A1* | 10/2016 | Ramasubramani | H04L 41/085 |
| 2017/0230236 A1* | 8/2017 | Kim | H04L 7/0008 |
| 2017/0289745 A1* | 10/2017 | Liu | H04L 67/125 |
| 2017/0353983 A1* | 12/2017 | Grayson | H04L 61/203 |
| 2018/0103038 A1* | 4/2018 | Burke | H04L 63/101 |
| 2018/0167407 A1* | 6/2018 | Ikeda | H04L 47/2441 |

* cited by examiner

NETWORK SECURITY SYSTEM AND METHOD THEREOF

CROSS-REFERENCE TO RELATED APPLICATION

This Non-provisional application claims under 35 U.S.C § 119(a) on Taiwan Patent Application No 106142424, filed on Dec. 4, 2017, which is herein incorporated by reference.

BACKGROUND

Technology Field

The present application relates to a network security system and method thereof. More particularly, the present application relates to a network security system with checking mechanism and method thereof.

Description of the Related Art

Nowadays, almost all computers, servers or personal communication devices have internet communication functions, and the internet is already an important tool in modern life. However, hackers can steal confidential information from computers via the internet. Therefore, in order to prevent the hackers from stealing confidential information, the firewall is usually installed when the local area network (LAN) of the enterprise or organization connected to the wide area network (WAN). The firewall is configured to provide data packet filtering to the system administrator or to perform the port setup to ensure the security of the networking products.

Under the TR181 communication standard, the system administrator can add, modify, or delete the parameter rules of the firewall. Sometimes, the system administrator would make mistakes, and it would cause the firewall having the potential security problems. Therefore, a system for securing networking products and following the TR181 communication standard is required.

SUMMARY

An aspect of the disclosure is to provide a network security method for a client device. The network security method includes operations of: running a firewall in the client device according to a first parameter corresponding to at least one setting category; receiving a second parameter transmitted by a server within a periodic communication interval; checking automatically whether a setting category of a second parameter matches the at least one setting category by the client device; if the setting category of the second parameter matches the at least one setting category, setting up the firewall according to the second parameter; and if the setting category of the second parameter does not match the at least one setting category, omitting the second parameter.

Another aspect of the disclosure is to provide a network security system. The network security system includes a server and a client device. The client device is configured for running a firewall according to a first parameter corresponding to at least one setting category, and receiving a second parameter transmitted by a server within a periodic communication interval. The client device further includes a monitoring unit. The monitoring unit is configured for checking automatically whether a setting category of the second parameter matches the at least one setting category during a communication period between the server and the client device; if the setting category of the second parameter matches the at least one setting category, setting up the firewall according to the second parameter; and if the setting category of the second parameter does not match the at least one setting category, omitting the second parameter.

Based on aforesaid embodiments, the network security system and method thereof are capable of filtering out the invalid settings so that the invalid settings will not run on the networking products. Under the TR181 communication standard, the system administrator can still modify the parameter rules of the firewall. In some embodiments, the network security system is able to securing the networking products.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

Figure 1:
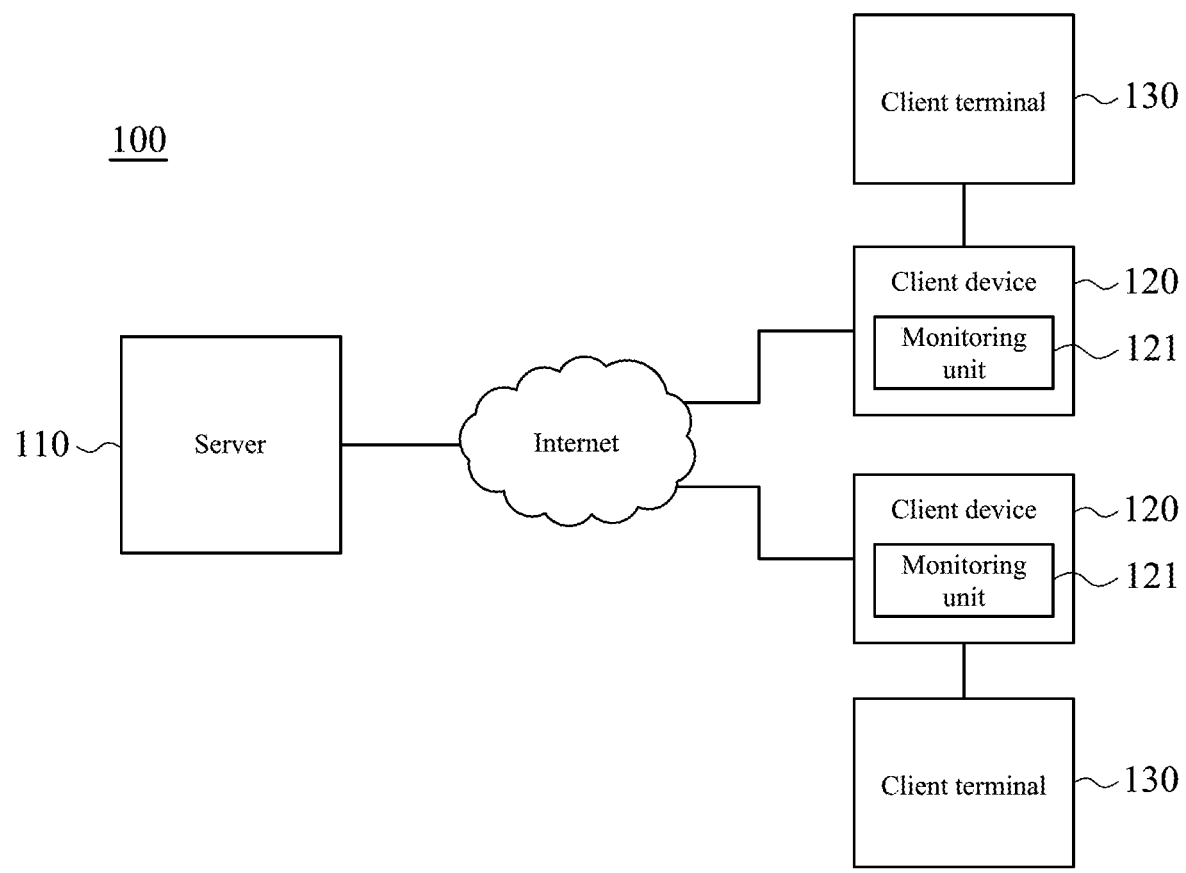
FIG. 1 is a schematic diagram illustrating a network security system according to an embodiment of the disclosure.

Reference is made to FIG. 1, which is a schematic diagram illustrating a network security system 100 according to an embodiment of the disclosure. As shown in FIG. 1, the network security system 100 includes a server 110, a client device 120 and a client terminal 130. The server 110 is connected to the client device 120 via the internet. The server 110 can communicate with the client device 120 within a periodic communication interval (e.g. synchronization, information exchange, parameter setting, etc.). The client device 120 is connected with the client terminal 130, and the client device 120 has a monitoring unit 121 and is configured to run the firewall to protect the computer of the client terminal 130, and to prevent the computer of the client terminal 130 from being exposed to risks of leakage or being attacked by hackers. In a preferred embodiment, the server 110 is capable of locating in a service provider terminal, and the client device 120 can be implemented by a cable modem. The client terminal 130 can be implemented by smart phone, computer, tablet, etc.; the disclosure is not limited thereto. The server 110 and the client device 120 comply with TR181 communication standard. The client device 120 includes the monitoring unit 121. The monitoring unit 121 is configured to monitor whether the category transmitted by the server 110 matches the default category.

Figure 2:
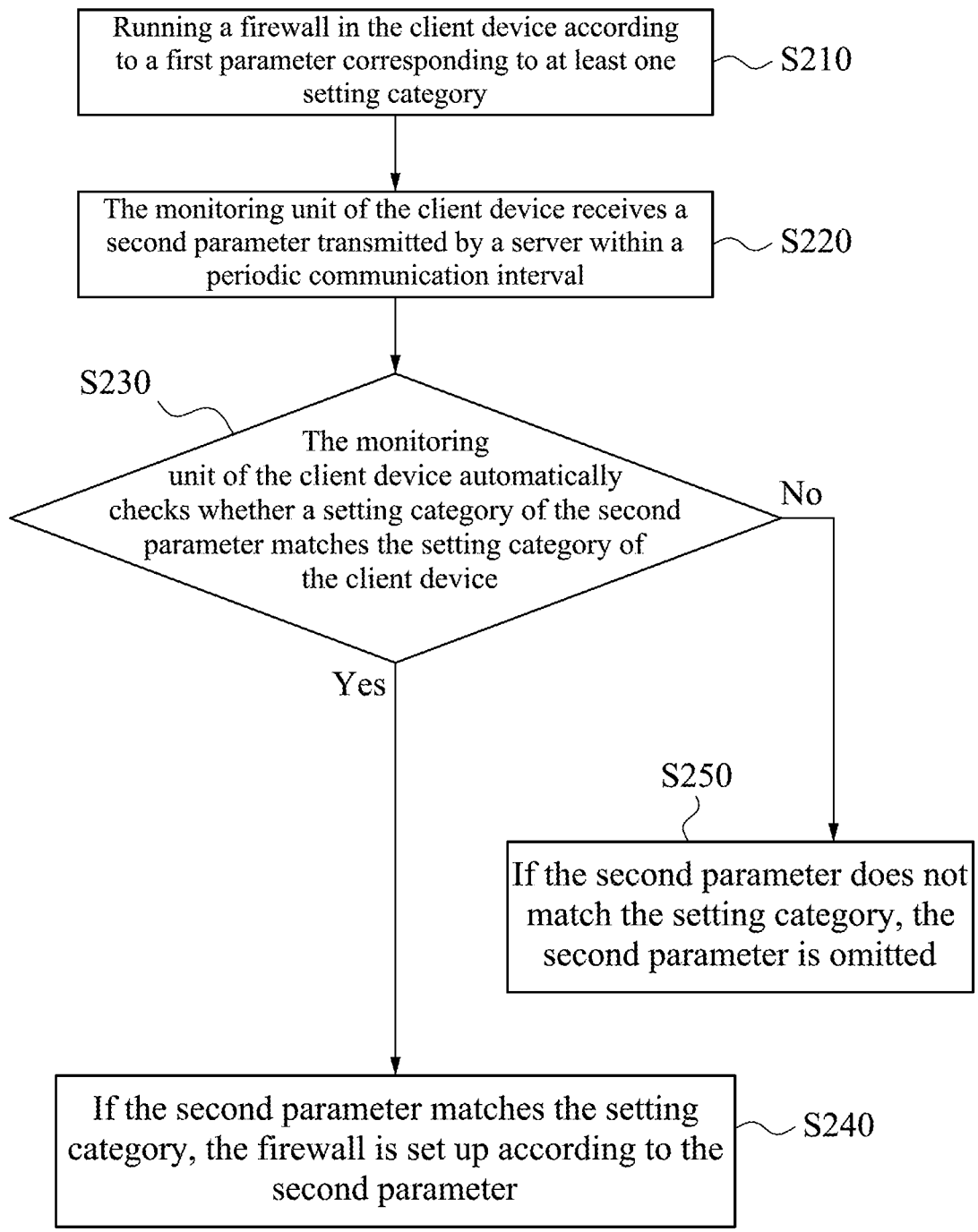
FIG. 2 is a flow diagram illustrating a network security method according to an embodiment of this disclosure.

Reference is made to FIG. 2, which is a flow diagram illustrating a network security method 200 according to an embodiment of this disclosure. In the embodiment, the network security method 200 can be applied to the network security system 100. The monitoring unit 121 installed on the client device 120 is configured to monitor whether the second parameter transmitted by the server 110 matches the default category according to the steps described in the following network security method 200. As seen in FIG. 2, the network security method 200 includes the following steps:

Step S210: running a firewall in the client device according to a first parameter corresponding to at least one setting category.

Step S220: the monitoring unit of the client device receives a second parameter transmitted by a server within a periodic communication interval.

Step S230: the monitoring unit of the client device automatically checks whether a setting category of the second parameter matches the setting category of the client device.

Step S240: if the second parameter matches the setting category, the firewall is set up according to the second parameter.

Step S250: if the second parameter does not match the setting category, the second parameter is omitted.

In the embodiment, the network security method 200 includes step S210 to run a firewall in the client device 120 according to a first parameter corresponding to at least one setting category. The setting category may be the default setting category of firewall that is set when the client device 120 is shipped out of the factory, or may be the setting category transmitted by the server 110 in the previous time. Each setting category includes a plurality of setting parameters, and the firewall is configured to filter the packet or the internet protocol (IP) address based on the original setting parameters or modified setting parameters.

In Step S220, the monitoring unit 121 of the client device 120 receives a second parameter transmitted by a server 110 within a periodic communication interval. The service provider can utilize the server 110 transmit the second parameter to the monitoring unit 121 via the internet to modify the setting parameters of the firewall.

In Step S230, the monitoring unit 121 of the client device 120 automatically checks whether a setting category of the second parameter matches the setting category of the client device 120. The second parameter that the service provider would like to modify is compared with the setting category after being transmitted from the server 110 within the periodic communication interval, to determine whether the second parameter matches the setting category. The periodic communication interval is a time period that the server 110 is utilized to periodically communicate with the client device 120. Therefore, the client device 120 could receive one or multiple of second parameters within the periodic communication interval. The monitoring unit 121 is configured to temporarily store the second parameter and check the second parameter in the end of the periodic communication interval.

In Step 240, if the second parameter matches the setting category, the firewall is set up according to the second parameter, and in step S250 if the second parameter does not match the setting category, the second parameter is omitted. In other words, only the parameters matched the setting category will be accepted and used to set up the firewall. The parameters that do not match the setting category will be omitted and the setting parameters run on the client device 120 will not be modified.

In an embodiment, the setting category includes at least one of a block fragmented packet IP category, a block ping category, a demilitarized zone (DMZ) category, an IP client filter category, a keyword filtering category, and a website filtering category, etc.; the disclosure is not limited thereto.

The block fragmented packet IP category is as follows: when the large sized packets are transmitted, those large sized packets are fragmented into smaller pieces (fragments), so that the block fragmented packet IP category allows the fragmented pieces to pass through, namely, blocking the unfragmented packets.

The main function of the block ping category is to test whether the network connection is normal, and this function is based on the IP protocol. The block ping category can report the minimum time, maximum time, and average time required for the Ping packets to arrive at the destination device. It can be utilized to confirm the reliability of the network path between the specified devices. The block ping category means "does not receive the Ping packets".

The demilitarized zone can be interpreted in the firewall field as a special area that neither belongs to the local area network nor the wide area network. The purpose of the demilitarized zone is to prevent hackers from directly accessing to internal information. In general, when most companies establish websites, they usually provide the demilitarized area for external users to use and query (internal confidential information is not included). In this case, if a hacker invades the demilitarized zone and crashes the network, the important information is still not leaked out. The demilitarized zone category is applied in the Network Address Translation (NAT) mode, and this mode allows the demilitarized zone to be accessible so that clients on the local area network can communicate with external computers through the demilitarized zone.

The function of the IP client filter category is used for choosing the IP address of the client to be filtered, so the IP client filter category can block untrusted client IP addresses.

The function of the keyword filtering category is used for filtering out the keywords or accounts, for example pornographic or violent words or accounts sending pornographic messages.

The function of website filtering category is used for filtering out the specific websites, for example the websites with pornographic or violent images or articles. The function of keyword filtering category and the website filtering category allows parents to manage the content of websites that children can see, and to filter some websites or web content that are not suitable for children.

Figure 3:
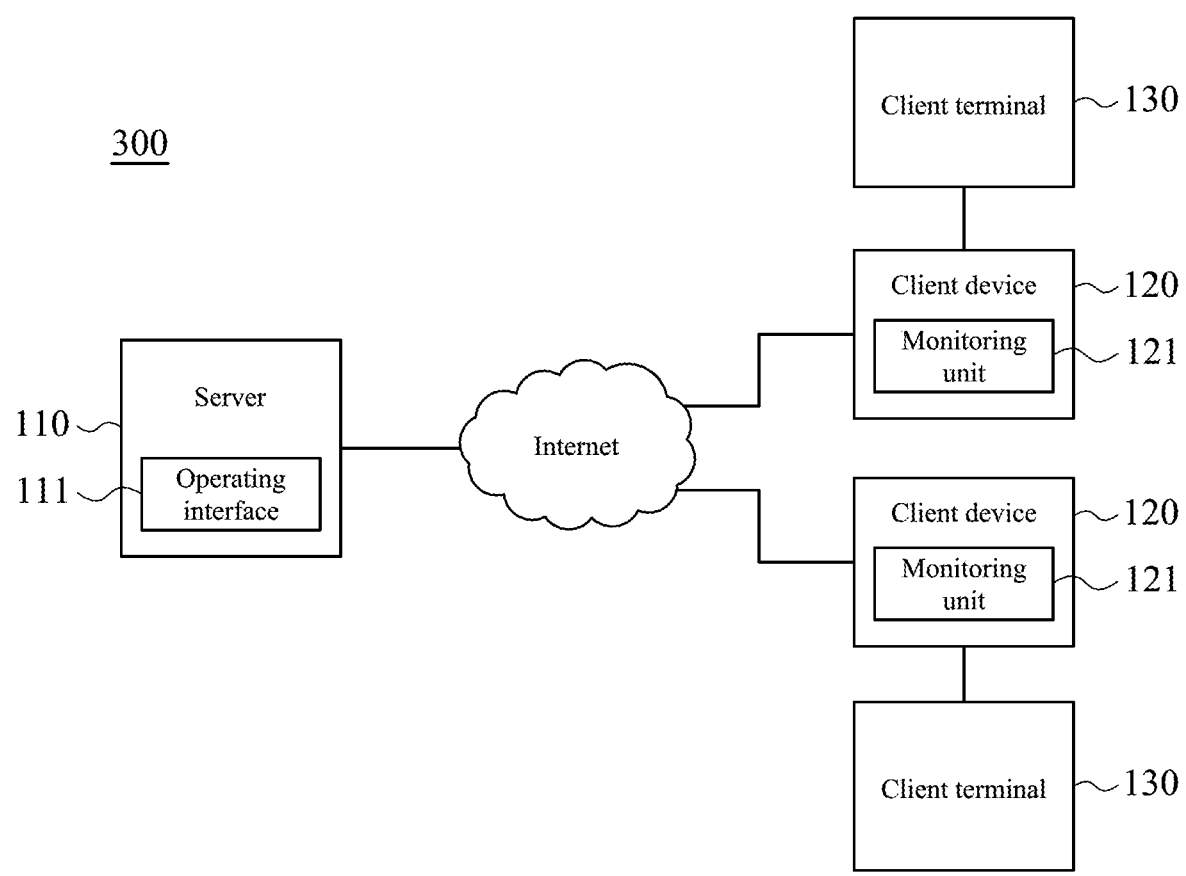
FIG. 3 is a schematic diagram illustrating a network security system according to another embodiment of the disclosure.

Reference is made to FIG. 3, which is a schematic diagram illustrating a network security system 300 according to another embodiment of the disclosure. As the example shown in FIG. 3, the network security system 300 includes a server 110 and a client device 120. The server 110 is connected to the client device 120 via the internet. The server 110 further includes an operating interface 111, which is configured to detect a second parameter input by the administrator at the server 110, and to transmit the second parameter to the monitoring unit 121 of the client device 120. The network security system 300 has the similar operations as the ones shown in FIG. 2, and may not be discussed in details.

Based on aforesaid embodiments, the network security system and the method thereof are capable of ensuring that the system administrator can still modify the firewall parameter under the TR181 communication standard. However, if the system administrators make mistakes, the monitoring mechanism will filter out the invalid settings and the invalid settings will not be run on the networking products. Therefore, the network security system is able to ensure the invalid settings will not be run on the fire wall, so as to protect the user's data.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A network security method for a client device, the network security method comprising:
   running a firewall in the client device according to a first parameter corresponding to at least one setting category;
   receiving a second parameter transmitted by a server within a periodic communication interval;
   checking automatically whether a setting category of the second parameter matches the at least one setting category corresponding to the first parameter by the client device;
   setting up the firewall according to the second parameter based on matching of the setting category of the second parameter with the at least one setting category corresponding to the first parameter; and
   omitting the second parameter based on mismatching of the setting category of the second parameter with the at least one setting category corresponding to the first parameter;
   wherein the first and second setting parameters are part of a plurality of setting parameters, wherein the setting parameters of a demilitarized zone category is used in network address translation mode and wherein the client device and the server comply with TR181 communication standard.

2. The network security method of claim 1, wherein the at least one setting category comprised at least one of a block fragmented IP packet category, a block ping category, the demilitarized zone category, an IP client filter category, a keyword filtering category, and a website filtering category.

3. The network security method of claim 1, wherein the server is located in server provider terminal and the client device is a cable modem.

4. A network security system, comprising:
   a tangible server; and
   a cable modem, configured for running a firewall according to a first parameter corresponding to at least one setting category, and receiving a second parameter transmitted by a server within a periodic communication interval, the cable modem further:
      checks automatically whether a setting category of the second parameter matches the at least one setting category corresponding to the first parameter during a communication period between the server and the cable modem;
      based on matching of the setting category of the second parameter with the at least one setting category corresponding to the first parameter, sets up the firewall according to the second parameter; and
      based on mismatching of the setting category of the second parameter with the at least one setting category corresponding to the first parameter, omits the second parameter;
      wherein the first and second setting parameters are part of a plurality of setting parameters, wherein the setting parameters of a demilitarized zone category is used in network address translation mode and wherein the cable modem and the server comply with TR181 communication standard.

5. The network security system of claim 4, wherein the at least one setting category comprised at least one of a block fragmented IP packet category, a block ping category, the demilitarized zone category, an IP client filter category, a keyword filtering category, and a website filtering category.

6. The network security system of claim 4, wherein the server is located in server provider terminal.

* * * * *